Nov. 7, 1967 C. F. MILLER, JR., ET AL 3,351,151
HARVESTING VEHICLE FOR SUPPORTING WORKERS
Filed Oct. 18, 1965
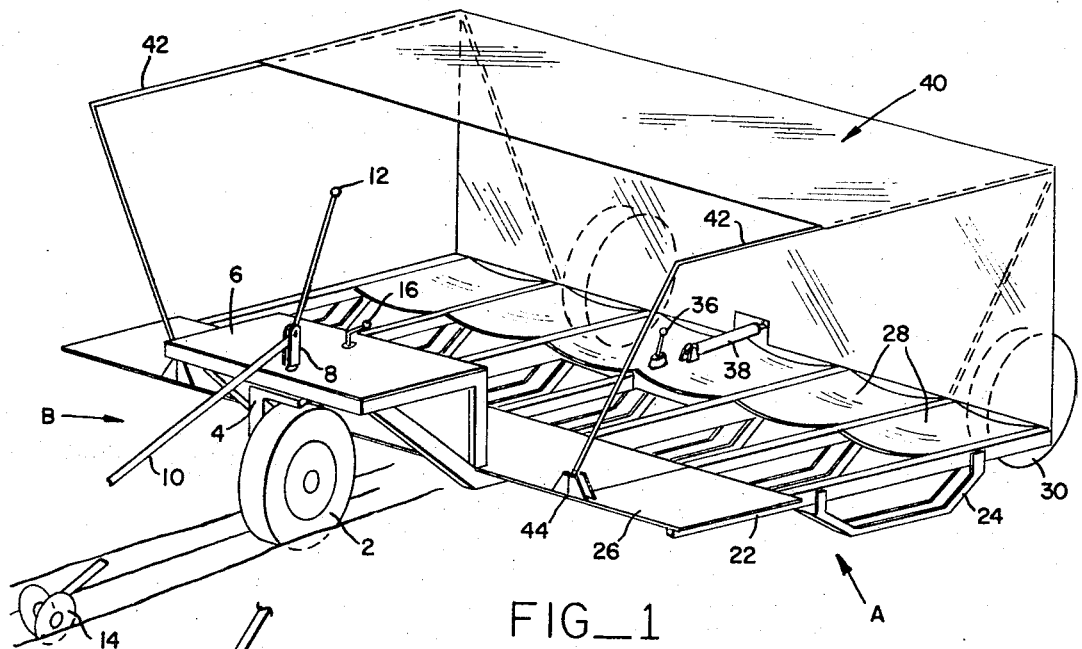
FIG_1
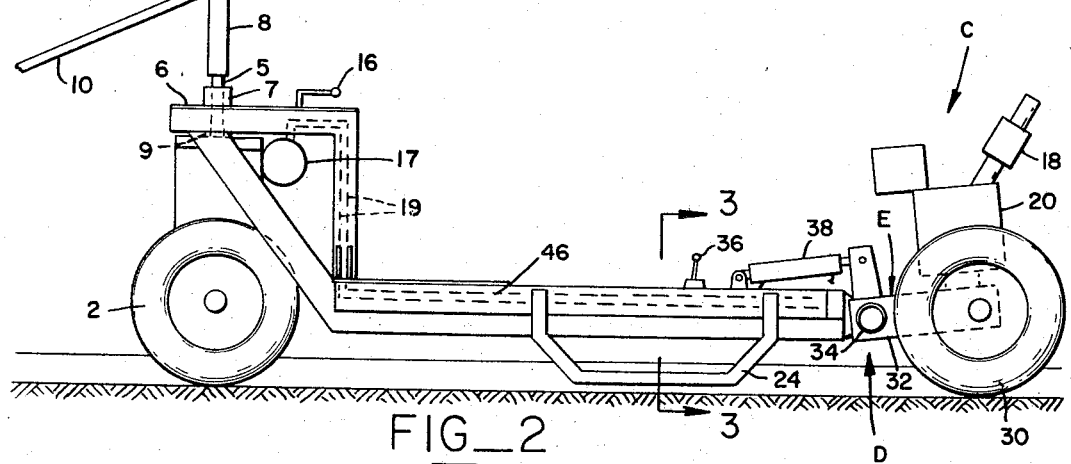
FIG_2
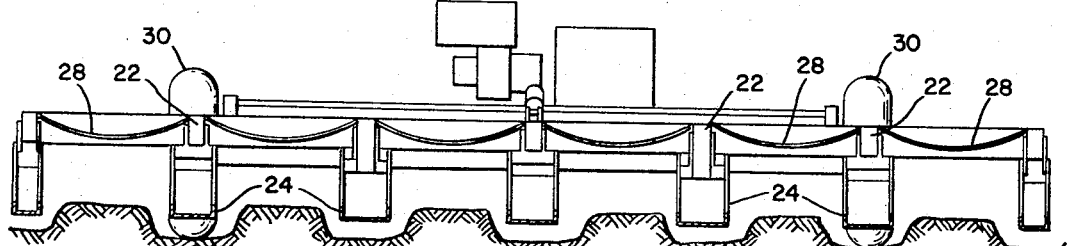
FIG_3
INVENTORS
CLINTON F. MILLER, JR.
ROBERT W. JOHNSON
BY
Townsend and Townsend
ATTORNEYS

United States Patent Office 3,351,151
Patented Nov. 7, 1967

3,351,151
HARVESTING VEHICLE FOR SUPPORTING WORKERS
Clinton F. Miller, Jr., and Robert W. Johnson, Watsonville, Calif., assignors to Johnson Ranch, Watsonville, Calif., a partnership
Filed Oct. 18, 1965, Ser. No. 497,219
9 Claims. (Cl. 180—26)

ABSTRACT OF THE DISCLOSURE

A self-propelled, wheeled, harvesting vehicle suitable for conveying a plurality of workers through a cultivated field in close, adjustable proximity to low-silhouette plants. In one aspect, the vehicle includes a mechanism for automatic guidance of the vehicle between parallel rows of the plants.

---

This invention relates in general to a mobile harvester and, more particularly, to a self-propelled harvesting vehicle employed for the transportation of field workers who are engaged in harvesting certain fresh fruit and vegetables which grow on low-silhouette perennial plants.

It is usually necessary to harvest crops such as strawberries, blueberries, blackberries and the like by hand, to insure that (1) the fruit selected has had time to properly develop and ripen, (2) the highly perishable berries are not damaged and, most importantly, (3) to eliminate destruction or damage of the individual plants which, with proper care, will continue to produce fruit for a number of years.

Heretofore, the harvesting operation has been difficult and extremely tedious, as the field workers have had to continuously bend or stoop to remove the desired ripened berries from each of the individual plants. This continuous stooping, especially when accompanied by the need for straightening up between plants, is extremely time consuming even for one who is experienced in this type of harvesting and is especially slow and difficult for the unskilled workers who comprise a large segment of the farm laborers presently available.

Broadly stated the present invention, to be described in greater detail below, is directed to a self-propelled carrier for transporting farm workers while they are engaged in harvesting crops from low-silhouette plants. In accordance with the invention the carrier is designed so that individual workers can be seated thereon in close proximity to the ground so as to eliminate the tiresome bending and straightening up heretofore required. Mechanism is provided to adjust the distance of the worker to the crop or ground. The harvesting carrier can be adapted to transport a number of farm workers as well as sufficient containers for the harvested crop necessary for them to work large areas.

In the preferred form the carrier is mounted on three wheels with the single wheel rotatable through 180° for reverse movement. This provides exceptional maneuverability and makes the carrier usable even in restricted areas at the ends of row crops. Also in the preferred form, the single front wheel is adapted for self-steering of the carrier so that the driver is available for other duties.

These features will become clearer and other objects will become apparent from the following description, especially with reference to the accompanying drawing in which similar characters of reference represent corresponding parts in each of the several views.

In the drawing:

FIG. 1 is a perspective view of a preferred embodiment of the instant invention;

FIG. 2 is a side elevation of the preferred embodiment of the invention illustrated in FIG. 1; and FIG. 3 is a sectional view of a portion of the structure shown in FIG. 2 on the line 3—3 taken in the direction of the arrows and illustrates certain components in further details.

Referring to the drawing with particular reference to FIG. 1, it will be seen that the self-propelled harvesting vehicle is constructed on a worker supporting frame A which may be made of a suitable metal, a steering and drive assembly B, a power supply assembly C, and variable elevating assembly D, and a second frame E.

Attached to frame A, front-steering assembly B includes a single front wheel 2 through which the vehicle may be self-propelled. Wheel 2 can be driven hydraulically as will be described later.

Wheel 2 is rotatably mounted on support member 4 which in turn depends from shaft 5. Shaft 5 loosely passes through table 6 to permit turning but is vertically held relative to table 6 by collars 7 and 9 which are fixed to shaft 5 on opposite sides of table 6. Union 8 joins shaft 5 to self-steering means 10, one end of which terminates in handle 12 and the other end of which terminates in double disc 14 depicted in the foreshortened portion of FIG. 1. The double disc 14 is constructed so as to glide between and track in the depression or furrow between adjacent rows of plants, thereby propelling the harvester in a predetermined direction, i.e., parallel with the rows of crops.

Steering means 10 may be a straight rod or it may be bent, as illustrated most clearly in FIG. 2, to more easily accommodate an operator or driver riding on table 6. To turn the vehicle up to 180° such as at the end of a row, the operator merely depresses handle 12 so that it swings steering means 10 about pivot 11 and discs 14 are raised sufficiently to clear the rows of plants. Handle 12 is rotated the desired amount through an arc of up to 180°.

Also located on table 6 adjacent union 8 is a speed control 16 for actuating the front wheel drive means which may comprise a hydraulic motor 17 mounted for power input to wheel 2. Speed control means 16 is connected to hydraulic power assembly C and more specifically to hydraulic fluid tank 20 to cause motive fluid to flow from tank 20 through hydraulic lines 19 to motor 17. Pump 18 maintains the fluid under pressure in tank 20.

Main frame A comprises a plurality of parallel spaced apart supporting members 22, best illustrated in FIG. 3. A foot rest 24 is suspended under each supporting member. The foot rests 24 are elongate and parallel to rows of crops to be harvested and are spaced so as to be individually suspended in a furrow between adjacent seed beds.

Positioned across preferably all of supporting members 22 adjacent the front ends thereof is a platform 26 upon which containers (not shown) for harvested crops can be placed. Platform 26 is preferably of a sufficient width to allow the driver-operator to move about and distribute additional containers and/or replace those which have been filled. Platform 26 should be wide enough to provide storage room together with table 6 for filled containers as well as for empty onces to be filled.

Located towards the rear of supporting members 22 are seats 28 formed of flexible material. A seat 28 is formed by suspending a slab of material between each pair of adjacent members 22. Canvas is especially attractive as it slopes close to the ground at the center between members 22 and allows the field worker to be comfortably positioned in close proximity to the row of plants.

As noted, the harvesting vehicle of the instant invention is so designed that the supporting members 22 are located so that when the harvester is passing through the ripened field, the members 22 pass between the rows of crops and preferably approximately equidistant from adjacent rows of crops. In this way, the worker positioned on each seat 28 with feet placed on the foot rests 24 adjacent to each seat 28 will be able to easily reach down between his legs to select the fruit ready for picking. It is to be noted that all but the two outside foot rests 24 are in a position to be shared by adjacent workers. As a result, these interior foot rests may be made wider to accommodate such joint use.

It will be appreciated by one skilled in the art that the width of the frame A and the number of positions available for workers, is a matter of choice. Spacing of seats and foot rests will depend on the layout used in planting the field to be harvested.

Variable elevating assembly D is so constructed as to enable one of the field workers being transported, and preferably the one centrally located, to raise or lower the position of seats 28 with respect to the rows of plants. To this end, frame E is attached to frame A through pivot connection 34. Seats 28 can be raised or lowered by changing the relative position of frame A with respect to frame E by actuating hydraulic ram 38 suitably mounted between the two frames. Ram 38 is motivated from the fluid in tank 20 through control 36.

Frame E may take any suitable form and may be formed to support pump 18 and tank 20. Rear wheels 30 are rotatably mounted on rear or second frame E. Rear wheels 30 are so positioned that they will follow furrow depressions parallel with the depression in which wheel 2 of steering assembly B is positioned.

Ram 38 is double-acting, that is, the cylinder of ram 38 has hydraulic fluid connections at each end. These fluid connections are linked to tank 20 through control 36. Ram 38 may thus be used to raise or lower seats 28.

In still another aspect of the invention, additional advantage and comfort for the workers can be obtained by employing an awning or shelter 40 supported on skeletal frame 42 attached to frame assembly A by any convenient means such as by mounting frame 42 in brackets 44 on platform 26.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A harvesting vehicle comprising: in combination, a main frame including a plurality of spaced-apart supporting members; at least one front wheel rotatably mounted on a first end of said main frame; a second frame pivotally connected to said main frame; rear wheels attached to said second frame; a double acting hydraulic ram connected to each of said frames to pivot the frames relative to each other to raise and lower the main frame with respect to the ground; means for imparting movement to said vehicle; seating means on said main frame between adjacent of said spaced-apart supporting members; and foot rests suspended from said supporting members.

2. A self-propelled harvesting vehicle in accordance with claim 1 wherein said means for moving said vehicle comprises a hydraulic motor.

3. A self-propelled, wheeled harvesting vehicle comprising: in combination, a main frame including a plurality of spaced-apart supporting members; at least one front wheel rotatably mounted on a first end of said main frame; means for raising and lowering said main frame with respect to the ground; steering means linked with said front wheel adapted for automatically guiding said vehicle in a direction parallel with rows of plants in a cultivated field; seating means on said frame between adjacent of spaced-apart supporting members; and foot rests suspended from said supporting members.

4. A harvesting vehicle in accordance with claim 3 wherein the steering means comprises an elongate member terminating at one end in a double disc adapted to travel between rows of crops.

5. A self-propelled, wheeled, harvesting vehicle comprising: in combination, a main frame including a plurality of spaced-apart supporting members; a single front wheel rotatably mounted on a first end of said main frame; means attached to said front wheel for imparting movement to said vehicle; means for raising and lowering said main frame with respect to the ground; seating means on said frame between adjacent of spaced-apart supporting members; and foot rests suspended from said supporting members.

6. A harvesting vehicle in accordance with claim 5 wherein said spaced apart supporting members are parallel and said foot rests are suspended under said supporting members in alignment therewith, the distance between foot rests being sufficient to permit said foot rests to be moved through furrows between seed beds.

7. A harvesting vehicle in accordance with claim 6 wherein said seating means comprises flexible fabric attached between adjacent parallel supporting members sloping downwardly towards the area therebetween, and positioned near said foot rests.

8. A harvesting vehicle in accordance with claim 5 including a platform positioned across the top front portion of said main frame.

9. A harvesting vehicle in accordance with claim 5 including a protective covering positioned above said main frame over said seating means.

References Cited

UNITED STATES PATENTS

| | | | |
|---|---|---|---|
| 1,756,803 | 4/1930 | Williams | 280—32.5 |
| 2,518,418 | 8/1950 | Chickering et al. | 280—32.5 X |
| 2,695,577 | 11/1954 | Webster | 280—32.5 X |
| 2,864,625 | 12/1958 | Clements | 280—43.23 |
| 3,116,806 | 1/1964 | Rose | 172—26 X |

FOREIGN PATENTS 509,411   8/1955   Italy.

KENNETH H. BETTS, *Primary Examiner.*